United States Patent
Johnson

(10) Patent No.: US 6,578,146 B2
(45) Date of Patent: Jun. 10, 2003

(54) SYSTEM, METHOD AND ARTICLE OF MANUFACTURE TO REMOTELY CONFIGURE AND UTILIZE AN EMULATED DEVICE CONTROLLER VIA AN ENCRYPTED VALIDATION COMMUNICATION PROTOCOL

(76) Inventor: R. Brent Johnson, 111 W. 5th St., Suite 300, Tulsa, OK (US) 74103

( * ) Notice: Subject to any disclaimer, the term of this patent is extended or adjusted under 35 U.S.C. 154(b) by 0 days.

(21) Appl. No.: 09/918,900

(22) Filed: Jul. 31, 2001

(65) Prior Publication Data

US 2001/0047471 A1 Nov. 29, 2001

Related U.S. Application Data

(63) Continuation-in-part of application No. 09/255,837, filed on Feb. 23, 1999, now abandoned, and a continuation-in-part of application No. 09/239,425, filed on Jan. 28, 1999, now Pat. No. 6,499,108, which is a continuation-in-part of application No. 08/892,982, filed on Jul. 15, 1997, now Pat. No. 5,970,149, which is a continuation-in-part of application No. 08/752,249, filed on Nov. 19, 1996, now abandoned.

(51) Int. Cl.$^7$ .............................................. G06F 11/30
(52) U.S. Cl. ........................ 713/189; 713/168; 713/170; 709/225; 709/226
(58) Field of Search ................................. 709/225, 226; 713/189, 168, 170

(56) References Cited

U.S. PATENT DOCUMENTS

| | | | | |
|---|---|---|---|---|
| 4,030,072 A | * | 6/1977 | Bjornsson ................. | 340/172.5 |
| 4,182,933 A | | 1/1980 | Rosenblum ................. | 179/1.5 |
| 4,310,720 A | | 1/1982 | Check, Jr. ................. | 178/22.08 |
| 4,430,728 A | | 2/1984 | Beitel et al. ................. | 364/900 |
| 4,531,023 A | | 7/1985 | Levine ........................ | 179/2 |
| 4,578,531 A | | 3/1986 | Everhart et al. ......... | 178/22.08 |
| 4,763,351 A | | 8/1988 | Lipscher et al. ............. | 379/95 |
| 4,965,804 A | | 10/1990 | Trbovich et al. .............. | 380/21 |
| 5,179,695 A | | 1/1993 | Derr et al. .................... | 395/575 |
| 5,204,961 A | | 4/1993 | Barlow ........................ | 395/725 |
| 5,237,677 A | | 8/1993 | Hirosawa et al. ........... | 395/575 |
| 5,347,578 A | | 9/1994 | Duxbury ........................ | 380/4 |
| 5,416,842 A | | 5/1995 | Aziz ............................ | 380/30 |
| 5,452,460 A | | 9/1995 | Distelberg et al. .......... | 395/700 |
| 5,537,554 A | | 7/1996 | Motoyama ................... | 395/280 |
| 5,550,984 A | | 8/1996 | Gelb ........................... | 395/200 |
| 5,598,536 A | * | 1/1997 | Slaughter et al. ........... | 395/200 |
| 5,678,002 A | | 10/1997 | Fawcett et al. ............. | 395/183 |

FOREIGN PATENT DOCUMENTS

EP      0474058 A2   11/1992  ........... G06F/11/00

OTHER PUBLICATIONS

Dorothy Denning, Cryptography and Data Security, Addison–Wesley Publishing Company 1982.*

* cited by examiner

*Primary Examiner*—Gail Hayes
*Assistant Examiner*—James Seal
(74) *Attorney, Agent, or Firm*—Head, Johnson & Kachigian

(57) ABSTRACT

Remote configuration and utilization of an emulated device controller via communication of encrypted data external to the controller. In a preferred embodiment, first and second software means executing within a server central processing unit facilitates secured and verified access to emulated input/output devices on behalf of a user community. The emulated input/output devices are further associated with session oriented application programs executed on one or more host central processing units. A user requests utilization of one or more emulated input/output device types whereupon the security software validates the user's request. If authorized, a hardware adaptor card is initialized with an input/output device configuration reflecting the user's request and control is passed to session oriented programs whereupon the user input/output requests are facilitated via an emulated device as opposed to physical devices associated with the host processors.

20 Claims, 7 Drawing Sheets

Server Initialization      Figure 2

| 201 | Driver | Initialize module-wide variables utilized by Driver. |
|---|---|---|
| 202 | Driver | Enumerate adaptors using the adaptor's vendor and device IDs. |
| 203 | Driver | Initialize adaptor-specific variables utilized by Driver. |
| 204 | Driver | Allocate/reserve adaptor resources |
| 205 | Driver | Reset the adaptor. |
| 206 | Driver | Download microcode to the adaptor. |
| 207 | Driver | Initialize the adaptor. |
| 208 | Driver | Request a connection to each unique IRQ |
| 209 | Driver | Initiate a timer and timer support. |
| 210 | Driver | Expose standard module-wide support to applications. |
| 211 | Host DLL | Initialize variables utilized by Host DLL. |
| 212 | Host DLL | Clear user connection block. |
| 213 | Host DDL | Expose and make available to SA, Adaptor specific Administrative instruction set. |
| 214 | Host DLL | Create a mutex (serialization mechanism) to be used by configuration support routines |
| 215 | Host DLL | Open (establishes communications with) the driver. |
| 216 | Host DLL | Request from the driver number of recognized adaptors. |
| 217 | Driver | Returns the number of adaptors in response to Host DLL request. |
| 218 | Host DLL | Request from the driver its version number. |
| 219 | Driver | Return the driver version number in response to the Host DLL request. |
| 220 | Host DLL | Record into SA log driver version and the number of adaptors it controls. |
| 221 | Host DLL | Indicate adaptor unavailability. |
| 222 | Host DLL | Load adaptor offline status. |
| 223 | Host DLL | Load adaptor activity status. |
| 224 | Host DLL | Load a second (independent) inactive configuration data sequence. |
| 225 | Host DLL | Ensure loaded adaptor configuration is within operational ranges. |

Server Termination    Figure 3

| 301 | Host DLL | Disconnect each currently connected user. |
|---|---|---|
| 302 | Host DLL | Force adaptors offline. |
| 303 | Host DLL | Close the driver. |
| 304 | Host DLL | Free all allocated storage and resources. |
| 305 | Driver | Stop the one-second timer. |
| 306 | Driver | Eliminate the module-wide exposure of support to applications through NT. |
| 307 | Driver | Ensure/cause each adaptor to be offline to the channel and reset the adaptor. |
| 308 | Driver | Disconnect all previously connected IRQs (through NT). |
| 309 | Driver | Destroy each adaptor object instance: |
| 310 | Driver | Destroy each of this adaptor's LU driver object instances: |
| 311 | Driver | Eliminate the exposure of LU support to applications through NT. |
| 312 | Driver | Free all allocated storage and resources. |

Adaptor Configuration Load

Figure 4

| 401 | Host DLL | Indicate adaptor unavailability. |
|---|---|---|
| 402 | Host DLL | For each client currently connected to an LU on this adaptor: issues client disconnect message and performs client disconnection |
| 403 | Host DLL | Record Adaptor load. |
| 404 | Host DLL | Determine empty/active configuration |
| 405 | Host DLL | Request driver configuration of adaptor. |
| 406 | Driver | Ensure/cause the adaptor to be offline to the channel. |
| 407 | Driver | Destroy each of adaptor's LU driver object instances: |
| 408 | Driver | Eliminate the exposure of LU support to applications through NT. |
| 409 | Driver | Free all allocated storage and resources. |
| 410 | Driver | Determine if LUs are to be emulated) |
| 411 | Driver | Request that the adaptor be brought online to the channel. |
| 412 | Host DLL | Indicate adaptor is availability for clients. |

Client Connection         Figure 5

| 501 | Client | Initialize client variables. |
|---|---|---|
| 502 | Client | Employ SA to effect a connection to the Host DLL. |
| 503 | Host DLL | Store client name. |
| 504 | Host DLL | Load client's "Adaptor Groups". |
| 505 | Host DLL | Create a new client object instance |
| 506 | Host DLL | Store client object in a user connection block. |
| 507 | Client | Send to command version level Host DLL Host DLL |
| 508 | Client | Store the client's command version level. Client |
| 509 | Client | Send to the Host DLL emulated device type of interest. |
| 510 | Host DLL | Store client's device type of interest. |
| 511 | Client | Request Host DLL command version level. |
| 512 | Host DLL | Return the Host DLL command version. |
| 513 | Client | Store the Host DLL's command version level |
| 514 | Client | Request currently available emulated devices of Host DLL |
| 515 | Host DLL | Return the response block (possibly empty) in response to the client's request. |
| 516 | Client | Request from the Host DLL to be connected to the LU. |

Client Disconnection        Figure 6

| 601 | Host DLL | If connected to an LU, close (cease communications with) the LU. |
|---|---|---|
| 602 | Host DLL | Terminate the threads that were created to perform I/O with the LU, if any. |
| 603 | Host DLL | If connected to an LU, Set the LU In-Use flag to "not in use". |
| 604 | Host DLL | If connected to an LU, Set the LU Client value to "none". |
| 605 | Host DLL | Free all allocated storage and resources for this client object. |

SYSTEM, METHOD AND ARTICLE OF MANUFACTURE TO REMOTELY CONFIGURE AND UTILIZE AN EMULATED DEVICE CONTROLLER VIA AN ENCRYPTED VALIDATION COMMUNICATION PROTOCOL

REFERENCE TO PENDING APPLICATIONS

This application is a continuation-in-part of(a) U.S. patent application Ser. No. 09/239,425 entitled "A Secure Electronic Mail System" filed on Jan. 28, 1999, now U.S. Pat. No. 6,499,108 issued on Dec. 24, 2002 and (b) Ser. No. 09/255,837 entitled "Method For Information Encoding And Transfer" filed on Feb. 23, 1999, now abandoned, which are continuation-in-part applications of co-pending U.S. patent application Ser. No. 08/892,982, filed Jul. 15, 1997, and entitled "Combined Remote Access and Security System", now U.S. Pat. No. 5,970,149 issued Oct. 19, 1999; which is a continuation-in-part of U.S. patent application Ser. No. 08/752,249, filed Nov. 19, 1996, and entitled "Combined Remote Access and Security System", now abandoned.

REFERENCE TO MICROFICHE APPENDIX

This application is not referenced in any microfiche appendix.

TECHNICAL FIELD OF THE INVENTION

The invention relates generally to a data processing system, method and article of manufacture allowing for the dynamic reconfiguration of an input/output device controller. In particular, the present invention relates to a computer-based system, method and article of manufacture which supports and facilitates a remote configuration and utilization of an emulated input/output device controller via encrypted data communication between a plurality of users and said controller.

BACKGROUND OF THE INVENTION

The present invention provides for secured, real-time, configuration and utilization of an emulated input/output device controller. The instant invention advances the art by allowing its practice to be supported via an encrypted communications protocol interfacing with, and relying upon, the teachings, practices and claims disclosed in co-pending U.S. patent application Ser. Nos. 09/239,425 and 09/255,837 (hereinafter synonymously referred to as "Secure Agent" or "SA").

Secure Agent Service Overview

The following overview is provided to facilitate a comprehensive understanding of the teachings of the instant invention. Secure Agent utilizes a secure login sequence wherein a client connects to a Secure Agent server using a key known to both systems and a client connects and presents the server with user identification (as used herein the term "client" refers synonymously to a remote user establishing, and communicating with the instant invention through Secure Agent allocation and encryption processes as taught in the above noted applications). If recognized, the Secure Agent server initiates a protocol whereby the client's identification is verified and subsequent communication is conducted within a secured (encrypted) construct. For purposes of this overview, the term "server" should be considered a hardware configuration represented as a central processing unit wherein Secure Agent, a Host DLL and driver reside, and are executed. The term "DLL" as used herein refers to a Secure Agent host dynamically linked library (a.k.a. Host DLL). The term "DLL" or "dynamically linked library" is used in a manner consistent with that known to those skilled in the art. Specifically, the term "DLL" refers to a library of executable functions or data that can be used by a Windows application. As such, the instant invention provides for one or more particular functions and program access to such functions by creating a static or dynamic link to the DLL of reference, with "static links" remaining constant during program execution and "dynamic links" created by the program as needed.

The Secure Agent server presents a variable unit of data, such as the time of day, to the client as a challenge. The client must then encrypt that data and supply it back to the server. If the server is able to decrypt the data using the stored client's key so that the result matches the original unencrypted challenge data, the user is considered authenticated and the connection continue. The key is never passed between the two systems and is therefore never at risk of exposure.

The initial variable unit of data seeds the transmission of subsequent data so that the traffic for each client server session is unique. Further, each byte of data transmitted is influenced by the values of previously sent data. Therefore, the connection is secure across any communication passageway including public networks such as, but not limited to, the Internet. The distance between the client and server is not of consequence but is typically a remote connection. For accountability purposes, the actions of a client may be recorded (logged) to non-volatile storage at almost any detail level desired.

The access rights of each client (what the client is able to accomplish during a session) is governed by data stored on the Secure Agent server to which the client is associated. As an example, such rights might encompass the ability to administer and utilize the services of the server system, which would, in turn, include capabilities such as adding new client users, changing a user's rights, transferring new code to the server, using a feature (or service) of the server and more.

Consequently, Secure Agent allows for the transmission of new code to the server and for that code to be implemented upon demand by a client. Such dynamic, real-time implementation in turn, allows for the behavior of the server to be modified. It is to this behavior modification the instant invention addresses its teachings, and thereby advances the contemporary art.

As will be readily appreciated by those skilled in the art, though the instant invention utilizes encryption/decryption and code recognition technology associated with Secure Agent, an alternative technology may be employed in support of the instant invention without departing from the disclosure, teachings and claims presented herein.

BRIEF SUMMARY OF THE INVENTION

The present invention is best viewed as comprised of two server components with one or more client subcomponents or sub-processes disclosed in association thereto. It can be further conceptualized that a distinguishable client component exists for each emulated device type recognized by the invention's server, with an individual client supporting the simultaneous use of a plurality of client-side components. As used throughout the instant invention specification and claims, the term "server" is used synonymously with "emulated device controller", "server central processing unit", "server CPU", and "remotely configurable input/output device controller" and the term "client" is used synonymously with "host user", "client central processing unit", "client CPU" and "remote user".

The invention's lower-most server component layer is a device driver to communicate directly with one or more hardware components attached to one or more computer systems, such as, but not limited to, mainframe computers (a.k.a. host processors). The driver controls the hardware in a manner prescribed by its design, causing it to interact with the other computer systems to which it is connected as if it were one or more device types (emulation). The driver additionally acts as a conduit to a higher level server component that governs the overall behavior of the emulated devices. This higher level component primarily supplies the driver with new data to provide through the emulated devices to the other computers to which it is connected and accepts data arriving to the emulated devices carried up by the device driver. Both layers predomoninantly operate on a device by device basis. The higher level server component, in turn, serves as the interface between Secure Agent technology and remotely connected clients allowing for the encrypted transmission of all data external to the server.

Using the example of an IBM 3215 console, a client would connect to a server and request a list of the 3215 devices which shared membership to the user's security groups. The user would select a device and a logical pathway from the mainframe computer to the client's system would become established. The client would communicate through the server layers with the end result of messages transported from a mainframe through an emulated device to the client for presentation within a window on a computer screen. Conversely, commands to the mainframe may be issued at the client's workstation and are transported through to the emulated device then through it to the mainframe.

Just as a client might have the ability to administer users (i.e. add/remove), a client might be able to modify the presence and behavior of emulated devices, via Secure Agent administrative functions as taught by the afore noted pending patent applications. Allowable configuration ranges and values are verified and enforced according to rules by the server. The various data elements that may be controlled are listed at the bottom of this section. The server disallows modification of the active configuration (apart from device names and their security groups) and forces such modifications to be made to an inactive configuration. This inactive configuration may be swapped with the active configuration (thus activating it) upon demand. Thus, a new configuration may be prepared prior to a decision made to put it into effect. Additional control functionality includes but is not limited to the following:

Recycling an adaptor that is connected to an external computer system. This is commonly referred to as a Power On Reset or, more simply, a POR.

Viewing which users are connected to which devices.

Disconnecting a client user from a device to which he is connected.

Activating an inactive configuration.

Copying the active configuration to the inactive configuration in order to make changes based upon the active configuration.

Purging the inactive configuration in order to start fresh.

Consequently it is an object of the instant invention to provide for remote control, operation and use of a server Central Processing Unit (CPU).

A further object of the instant invention is to provide for a secured logon sequence utilizing encrypted data transmission in accordance with the teachings, disclosure and claims of the above noted pending patent applications.

Yet another object of the instant invention is to insure that all data transferred external of the emulated input/output device controller is encrypted in accordance with the teachings of the above noted pending patent applications.

A further object of the instant invention is to provide the ability for an administrator to alter and manage the configuration of emulated mainframe peripheral devices.

A further object of the instant invention is to allow the selective addition or restriction in the presence of devices to one or more host processors such as, but not limited to, mainframe computers.

Another object of the instant invention is to provide for a configuration specification which provides the ability to arbitrarily name each emulated device and assign it to one or more security groups of which a user must be a member in order to access that particular device.

An additional object of the present invention is to provide the capability by which an administrator may add and remove one or more users with respect to emulated input/output device allocation.

Yet another object of the instant invention is to provide a facility by which an administrator may manage the security groups to which a user belongs, thus controlling the access of devices by users at any level desired down to an individual user level.

A further object of the instant invention is to provide the ability for a user to access and operate an emulated input/output device.

Yet another object of the instant invention is to provide the facility by which an administrator may effect/implement new device emulation types.

Another object of the instant invention is to provide support for multiple device types which may be simultaneously supported and operated.

Responsive to the foregoing challenges, the Applicant has developed an innovative system, method and article of manufacture to remotely configure and utilize an emulated device controller via an encrypted validation communication protocol.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Additional objects and advantages of the invention are set forth, in part, in the description which follows and, in part, will be apparent to one of ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

BRIEF DESCRIPTION OF THE DRAWINGS

FIG. 2 is a logic flow diagram illustrating processing steps associated with the server initialization processing subcomponent of the instant invention when practiced in its preferred embodiment.

FIG. 3 is a logic flow diagram illustrating processing steps associated with the server termination processing subcomponent of the instant invention when practiced in its preferred embodiment.

FIG. 4 is a logic flow diagram illustrating processing steps associated with the adaptor configuration load processing subcomponent of the instant invention when practiced in its preferred embodiment.

FIG. 5 is a logic flow diagram illustrating processing steps associated with the client connection processing subcomponent of the instant invention when practiced in its preferred embodiment.

FIG. 6 is a logic flow diagram illustrating processing steps associated with the client disconnection processing subcomponent of the instant invention when practiced in its preferred embodiment.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
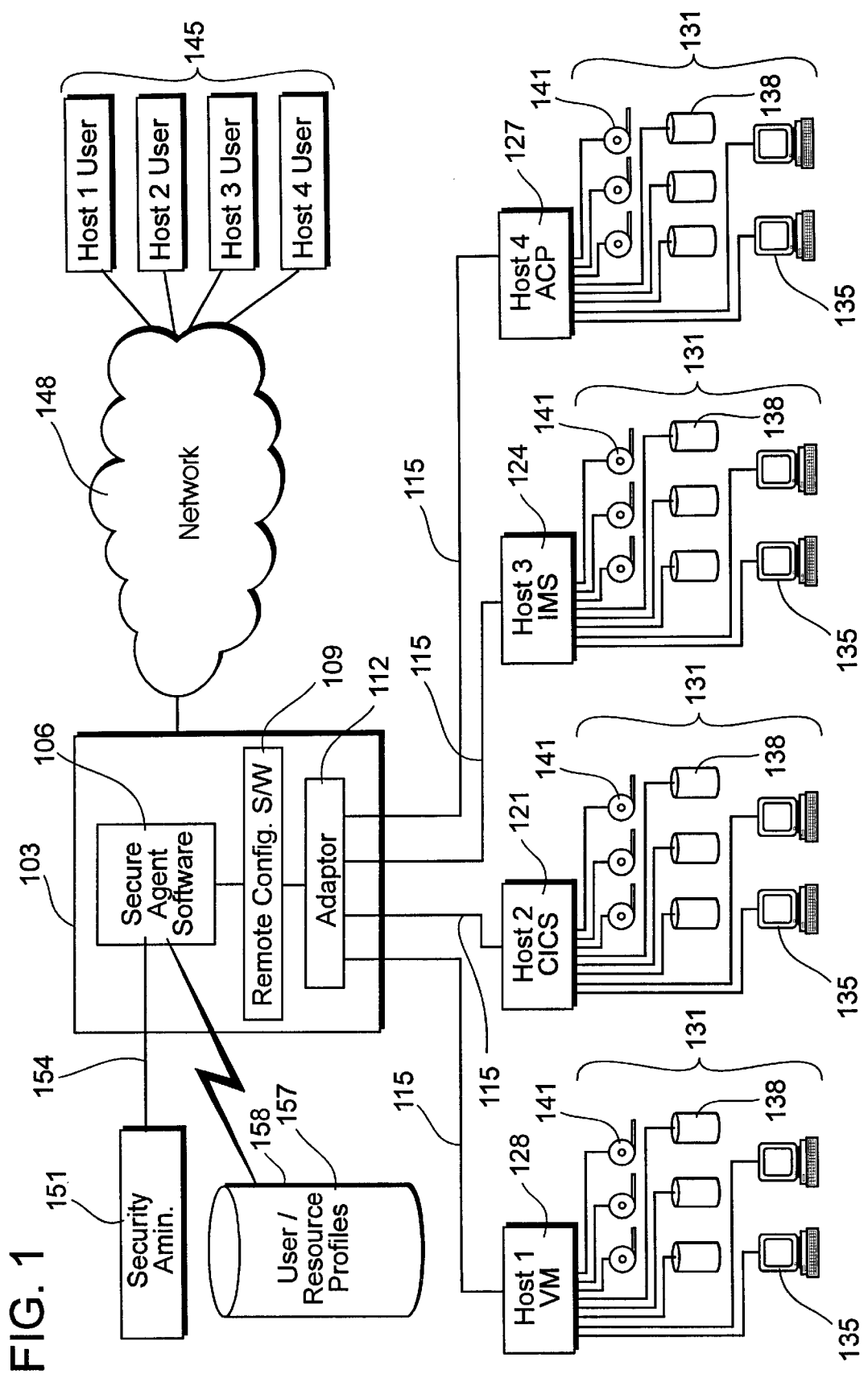
FIG. 1 is a system schematic providing a conceptual overview of primary hardware and software components of the instant invention as practiced in its preferred embodiment.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled. Turning now to FIG. 1.

In FIG. 1, a server CPU 103 has executing under control of its control program, Secure Agent software 106. The present invention advances the art and improves upon technology taught and claimed in the above noted pending applications, said applications and teachings incorporated by reference herein. The server 103 also has operating under control of its control program the remote configuration software 109 of the instant invention. Embodied within the server 103 is a hardware adaptor card 112. Said adaptor card 112 is in turn communicably attached to one or more host processors (121, 124, 127, 128). As used herein, the term "adaptor" refers synonymously to those hardware configurations such as, but not limited to, "adaptor cards" which allow for connectability between two or more central processing units and the transference of data associated therewith. Illustrative non-limiting examples of such adaptors as used herein would include Crossroads ESCON adaptors, Crossroads ESCON parallel adaptors, Bus-Tech adaptors and IBM ESCON adaptors.

In FIG. 1, the host processors (121, 124, 127, 128) are illustrated as Host 1 128 executing as its control program a VM system, Host 2 121 operating under as its control program a CICS system, Host 3 124 operating under the controller of its control program an IMS system and Host 4 127 operating under the dispatching control of its control program (ACP) a plurality of application specific programs. In turn, each of the host processors 128, 121, 124 and 127 illustrated in FIG. 1, have connected to it one or more physical input/output devices 131. In FIG. 1, said input/output devices are depicted as tape drives 141, direct access storage device 138 and smart terminals/personal computer/client computing capabilities 135. Also shown in FIG. 1 is a plurality of clients referred to as Host users 145 which are communicably attached to the server 103 of the instant invention via a communications network 148 such as, but not limited to, the Internet or other computer compatible network wherein computer recognized and generated signals may be communicated between one or more central processing units.

Lastly shown in FIG. 1 is a Security Administrator client 151 interactively communicating with the Secure Agent software 106 operating within the server 103. As will be discussed in further detail and in association with FIGS. 2 through 7, the Security Administrator 151 utilizes Secure Agent software 106 to administer and maintain user/resource profiles 157 and further communicates with information conveyed to said Secure Agent software 106 via the software processes associated with the remote configuration software 109 of the instant invention.

For purposes of clarity and to assist in comprehension of the instant invention, it is convenient to view the invention as being comprised of a number of processing subcomponents. Such processing subcomponents include, but are not limited to, Server Initialization Server Termination, Adaptor Configuration Load, Client Communication, Client Termination and Administration related subcomponents.

The following discussion in association with FIG. 1 provides a brief non-limiting synopsis of the teachings of the instant invention and generally discusses the interrelationships of hardware and software processing components of the instant invention. In FIG. 1, a Security Administrator 151 defines via Secure Agent software 106, user and resource profiles 157. Such profiles are stored in a non-volatile storage medium, such as but not limited to, a disk drive 158. User resource records are those records which typically define security group or groups, and access control variables associated with the user. Stated succinctly, the user resource record/profile defines those resources that the user may utilize and the bounds of such utilization. The Security Administrator 151 may also define resource profiles, such resource profiles define the device type and grouping of emulated input/output devices as well as central processing unit designations associated with each emulated device type and/or grouping. When attempting to establish a session between a host user 145 and any one of the operating systems and/or application programs operating under the dispatching control of the operating systems of host processors 128, 121, 124 or 127, a user via a communications network 148 communicates first with Secure Agent software 106 operating within the server 103 of the instant invention 109. Assuming the user 145 is recognized as an authenticated and authorized user of the system as governed by Secure Agent software 106, the user 145 next requests a device or a device grouping of emulated input/output devices he or she anticipates utilizing in the requested session. The Secure Agent software 106 verifies the user 145 as authority to allocate such emulated input/output devices and correspondingly associates such devices with the user and user session between one or more of the host processors 128, 121, 124 and 127. Once established, the session continues as normal with input/output requests of the user serviced via emulated input/output device as opposed to the real input/output devices 131 associated with one or more of the host processors. Upon completion of the session or a specific deallocation request initiated by the user, the client termination subprocess of the instant invention deallocates the emulated input/output device or devices. As indicated, the processing subcomponents of the instant invention further include Adaptor Configuration Load, Client Communication, Client Termination, Administration, Server Initialization and Server Termination subprocesses. It is to such subprocesses FIGS. 2 through 7 address themselves. A more detailed disclosure of each subprocess follows.

FIG. 2 discloses in further detail the process steps in which the server of the instant invention is initialized. While discussion of the individual subprocesses is provided in an illustrative logic sequence, it is to be noted that process steps defined therein need not occur in a serial manner. Rather it is expressly recognized that many of the subprocesses execution steps may be executed in a concurrent manner, or have their execution sequence factored upon the statusing of a previously executed process step.

Server Initialization, FIG. 2

With respect to server initialization, the driver of the instant invention first initializes all driver module-wide variables, such as clearing out how many adaptors are being supported, 201. Once these variables have been initialized, adaptors are located by enumerating all peripheral component interconnect computer Bus-type (PCI) devices present in the system using data and techniques published by the PCI Special Interest Group and by Microsoft's Window's NT Device Driver Kit (DDK). Specifically, the adaptor vendor and device IDs 202 are referenced to identify the presence of such supported adaptors. For each adaptor located, adaptor specific variables are initialized by the driver 203, with the resources used by the adaptor, such as buffer areas and IRQ (interrupt request lines) being next allocated and reserved 204 using functions provided by DDK. The adaptor is then reset 205 by the driver using a technique made known by the adaptor's manufacturer. Since these adaptors are generally intelligent it is necessary to transfer (download) to them microcode (a manufacturer-supplied program specific to such a device) that controls internal instruction sequencing. Therefore, microcode is downloaded into the adaptor 206 in a manner prescribed by the adaptor manufacturer with the adaptor then considered initialized 207. The driver next requests a connection to each unique IRQ so that any interrupts generated by any of the recognized adaptors may be serviced by the driver 208 and next initiates timer support 209 so that approximately once every second, general operations may be performed on behalf of each adaptor. This support typically, though not limitedly, includes ensuring an adaptor does not generate a non-detected interrupt. Having once initiated its timer 209, the driver next exposes standard module-wide support to all applications 210, which allows for communications with the driver as to be established by the Host DLL.

Subsequent to the driver initialization, the Host DLL initializes variables it utilizes 211 and clears a user connection block to allow information for each user to be represented 212. The Host DLL further exposes and makes available to Secure Agent a block of data, representing an emulated device specific administrative instruction set 213, for each user. In addition to such normal data elements as a user ID and password, this instruction set advises Secure Agent to maintain device type and security group strings on behalf of each user specifically for the support of this Host DLL. The device types limits those types of emulated devices to which a user might claim access whereas the device security groups name the emulated device security groups to which a user is subscribed. In addition, at this stage linkage to configuration support routines within the Host DLL is also established. As practiced in one embodiment of the invention, the root name of the administrative tree structure is exposed to Secure Agent indicating that the Host DLL supports the configuration of information and will respond in a positive manner to requests for information and management of branches under this particular root. The Host DLL next creates a mutex serialization mechanism to be used by configuration support routines during access of adaptor configuration data to insure data integrity 214. This serialization mechanism is used to prevent for example potential simultaneous updates by multiple administrators as well as to prevent a client from enumerating emulated devices while it is being manipulated.

The Host DLL continues to open or otherwise establishes communication with the driver 215 and requests from it a number of recognized adaptors 216 to which the driver responds 217, whereupon the Host DLL requests from the driver its version number 218 to which the driver also responds 219. The Host DLL then records into a Secure Agent log the driver version and the number of adaptors it controls 220, and proceeds to indicate that each adaptor is not yet in a condition to support client connectivity 221. Data representing the adaptor configuration to be utilized (the active configuration) is next loaded 223. This data specifies device types and number of devices to be emulated, in conjunction with user-friendly (readable) names and security groups for each such emulated device. A second unique set of this data is loaded (the inactive configuration) 224 on behalf of this same adaptor to be used as a work area for administrators. This allows administrators to accumulate a series of configuration changes prior to effecting the activation of those changes as a whole. During said initialization, the Host DLL lastly ensures that the loaded adaptor configurations are within operationally permissible parameters 225.

FIG. 3 is a logic flow diagram illustrating processing steps associated with the server termination processing subcomponents of the instant invention as practiced in its preferred embodiment. Turning now to FIG. 3.

In FIG. 3 with respect to server termination, the Host DLL first disconnects each currently connected user 301. Such disconnection is facilitated via processing accommodated in the Client Disconnection Processing subcomponent as will be discussed in association with FIG. 6. Recognized adaptors are then set offline to their channels through the Adaptor Configuration Load processing subcomponent 302. The Host DLL next ceases communication, or closes the driver 303, and frees all allocated storage and resources 304. The one second timer is then closed by the driver 305 and module-wide exposure of support to application through NT is eliminated 306. The driver then ensures/verifies each adaptor is offline to the channel and the adaptor is reset 307, disconnects all previously connected IRQ's 308, and destroys each object instance 309. Such destruction further includes but is not limited to elimination of exposure of the emulated devices support to applications through NT 310 and the freeing of all allocated storage and resources 311.

FIG. 4 is a logic flow diagram illustrating the processing steps associated with the Adaptor Configuration Load processing subcomponent of the instant invention as practiced in its preferred embodiment.

In FIG. 4 the Host DLL first indicates the adaptor's unavailability 401 and for each client currently connected to a logical unit on this adaptor, issues a message to the client indicating that the client is being disconnected due to administrative device management 402. The Host DLL then performs the client disconnection services in association with the invention's Client disconnection subprocess as will be discussed in further detail in association with FIG. 6. The Host DLL continues by next recording into Secure Agent log the configuration for this adaptor is being loaded 403 and if the adaptor is to be forced offline to the mainframe to which it is connected 404, prepare and uses an empty configuration indicating that Emulated devices are not to be emulated during this session. If the adaptor is not to be forced offline, an active configuration for the adaptor is provided and a request that the adaptor using the active configuration data is initiated 405. The driver as instructed causes the adaptor to be offline to the channel at this stage in the adaptor configuration load 406, destroys each of the adaptor emulated devices driver object instances 407 causing or eliminating the exposure of emulated devices support to applications through NT 408 and frees all allocated storage and resources 409. The driver next determines if Emulated devices are to be emulated 410 and then request that the adaptor be brought online to the channel 411, lastly indicating that the adaptor is available for client use 412.

FIG. 5 is a logic flow diagram illustrating the processing steps associated with the Client Connection processing subcomponent of the instant invention as practiced in its preferred embodiment.

Client Connection, FIG. 5

In FIG. 5, a client connection first initializes variables that it utilizes 501 then employs Secure Agent client code in order to establish a connection to the Host DLL 502, whereupon the Host DLL retains the client's name 503 and loads the client's device type and security groups 504. A new client object instance is then created to represent this new client connection with the variables it will use becoming initialized 505. The Host DLL then stores the location of the client object in a user connection block 506. At this point the client sends to the Host DLL the command version level that represents the client feature set as a means to facilitate backward compatibility by future Host DLLs 507 which the Host DLL stores for possible reference 508. By knowing the version of the client, the Host DLL can and will prevent communicating with older clients in a manner supported only by newer clients, whereas newer clients will be able to take advantage of a fuller set of features that the Host DLL offers. The client next provides to the Host DLL the emulated device type in which it is interested 509 whereupon the Host DLL stores it for later reference 510. The client then requests of the Host DLL its command version level 511 that the client stores for possible reference 513. Just as with the Host DLL being able to restrict its behavior for older clients, since the client knows the version level of the Host DLL it can restrict itself from attempting to take advantage of features available only on newer servers whereas newer servers might be more fully exploited. The client then requests from the Host DLL a list of the currently available emulated devices to which the client may connect 514. The Host DLL returns the response back 515 whereupon the client selects one of the emulated devices and requests that the Host DLL establish a connection to it on its behalf 516.

FIG. 6 is a logic flow diagram illustrating the processing steps associated with Client Disconnection processing subcomponent of the instant invention as practiced in its preferred embodiment.

As can be seen in FIG. 6, the Host DLL destroys the client object instance which requires the following activity. If connected to a logical unit, the logical unit is closed 601 and the threads that were created to perform input/output device of the logical unit, if any, are terminated 602. If connected to a logical unit, the logical unit-in-use flag is set to not in use 603 and if connected to a logical unit, the logical unit client value is set to none 604. The Host DLL lastly frees all allocated storage and resources for the client object 605.

Administrative Configuration

When an administrator desires to modify the configuration of adaptors managed by the Host DLL it issues requests for enumeration of the "/Adaptors" root and its branches to which the Host DLL will respond. This provides the administrator with the means necessary to discover what information exists to be changed. The data exposed through these branches correlates to the data within the active and inactive configurations for each adaptor.

Once supplied with the name and value of a piece of adaptor configuration data an administrator can decide whether or not to make changes to it and, if so, supply that name with a new value back to the Host DLL which will then make that change on the administrator's behalf.

Additionally, an administrator may enumerate a series of controls that can be employed for special actions by the Host DLL against an adaptor. Specifically, an administrator might decide to activate the inactive configuration, whereupon the Host DLL will exchange the data of the active configuration with that of the inactive configuration then perform the actions detailed with Adaptor Configuration Load, FIG. 4. If, on the other hand, an administrator opted to copy the contents of the active configuration into that of the inactive configuration then the Host DLL would perform that action. An administrator also has the option to simply clear out the inactive configuration whereupon the Host DLL would reinitialize it to reflect the absence of configured emulated devices. If an administrator decided it was necessary to reinitialize the adaptor then he could specify that the Host DLL do so whereupon it would perform the actions detailed with Adaptor Configuration Load, FIG. 4. Finally, if an administrator decided that an adaptor should either be kept offline or could come back online then he could request that of the Host DLL and it would toggle that state for the adaptor then perform the actions detailed with Adaptor Configuration Load, FIG. 4.

Non-limiting examples of dialog and processing as provided for in the invention's administrative configuration subcomponent follow immediately for purposes of facilitating full and enabling disclosure.

Connected Client Traffic from Logical Unit: Mainframe Message (3215 Example)

When the adaptor interrupts with a message from the mainframe then that message is first caught by the driver emulated devices object and carried up into the Host DLL by a thread created on behalf of the client that performs I/O against the Logical unit. This message is then transmitted through SA to the client.

Connected Client Traffic from Logical Unit: Online or Offline Event (3215 Example)

When the adaptor is found to go online or offline to the channel then that event is first caught by the driver emulated devices object and carried up into the Host DLL by a thread created on behalf of the client that performs I/O against the Logical unit. This event is then transmitted through SA to the client.

Connected Client Traffic from Client: Mainframe Command (3215 Example)

The client may send a mainframe command to the Host DLL which is immediately transported to the driver emulated devices object by a thread created on behalf of the client that performs I/O against the Logical unit. The driver emulated devices object then requests that the adaptor send the command to the mainframe.

Figure 7:
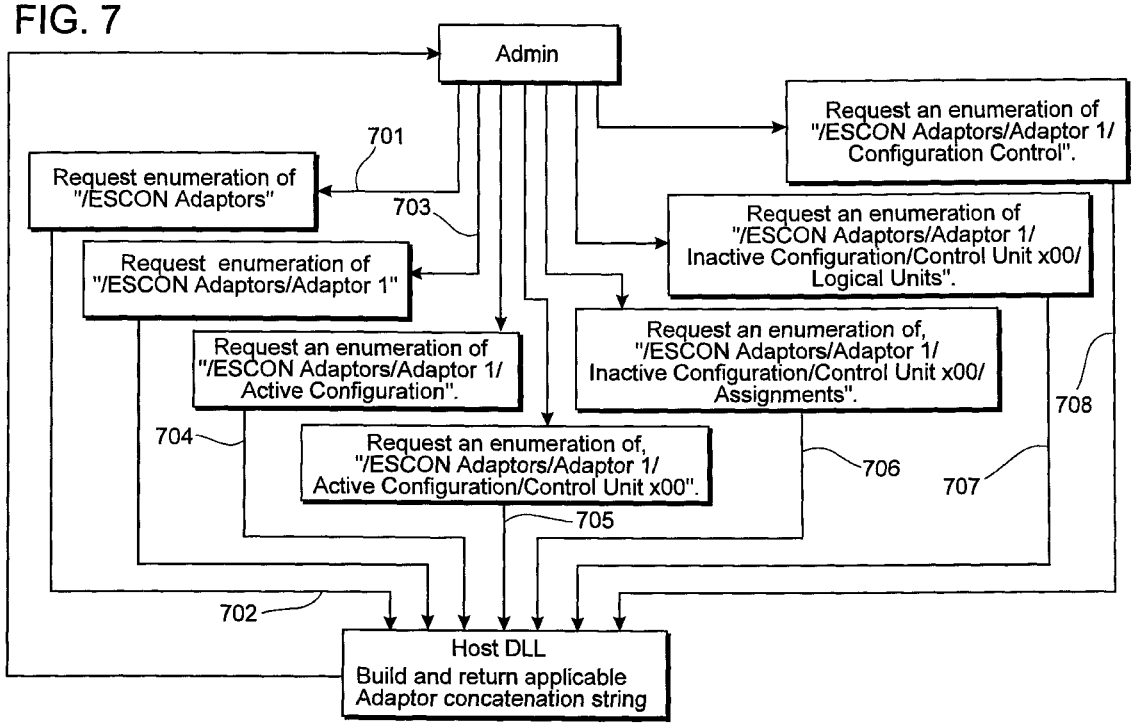
FIG. 7 is a logic flow diagram illustrating processing steps associated with administrative functions given illustrative user response/input strings.

FIG. 7 is a logic flow diagram illustrating processing steps associated with administrative functions given non-limiting examples of user input command strings. Turning now to FIG. 7.

Administration of Adaptor Configuration Data: Input Request=Enumerate Branch/Adaptors Administrator requests an enumeration of "/ESCON Adaptors" 701.

Host DLL builds and returns a string consisting of a concatenation of all the adaptors, in the form of Adaptor # where # is the 1-based number of the adaptor, along with a flag for each indicating that each element has, in turn, more branches 702.

Administration of Adaptor Configuration Data: Input Request=Enumerate Branch/Adaptors/Adaptor #

Administrator requests an enumeration of, for example, "/Adaptors/Adaptor 1" 703.

Host DLL builds and returns a string consisting of a concatenation of "Active Configuration" and "Inactive Configuration", each with a flag for each indicating that they have, in turn, more branches, along with a string of "Configuration Control" with a flag indicating that it has values 702.

Administration of Adaptor Configuration Data: Input Request=Enumerate Branch/Adaptors/Adaptor #/(In)Active Configuration Administrator requests an enumeration of, for example, "/Adaptors/Adaptor 1/Active Configuration" 704.

Host DLL builds and returns a string consisting of a concatenation of 16 CUs, in the form of Control Unit x## where ## is hexadecimal from 00 through 0F, along with a flag for each indicating that each element has, in turn, more branches 702.

Administration of Adaptor Configuration Data: Input Request=Enumerate Branch/Adaptors/Adaptor #/(In)Active Configuration/Control Unit x##

Administrator requests an enumeration of, for example, "/Adaptors/Adaptor 1/Active Configuration/Control Unit x00" 705.

Host DLL builds and returns a string consisting of a concatenation of "Assignments" and "Logical Units", each with a flag indicating that they have values 702.

Administration of Adaptor Configuration Data: Input Request=Enumerate Branch/Adaptors/Adaptor #/(In)Active Configuration/Control Unit x##/Assignments Administrator requests an enumeration of, for example, "/Adaptors/Adaptor 1/Inactive Configuration/Control Unit x00/Assignments" 706.

Host DLL builds and returns a string consisting of a concatenation of the following: 702

A. "Controller Type" with a flag indicating the data presentation to be a drop-down box.

This includes a list of all of the valid CUTypes (i.e. 7412, 3174) along with the currently assigned value. This value is taken from the specified Adaptor configuration data for this adaptor, indexed to the specified control unit.

B. "Base Address" with a flag indicating the data presentation to be a text box. This includes the currently assigned value. This value is taken from the specified Adaptor configuration data for this adaptor, indexed to the specified control unit.

C. "Device Count" with a flag indicating the data presentation to be a text box. This includes the currently assigned value. This value is taken from the specified Adaptor configuration data for this adaptor, indexed to the specified control unit.

D. If the specified Adaptor configuration is the active configuration then a flag is added to all fields marking them as non-modifiable meaning that this data cannot be changed. For these particular datas only that within the inactive configuration may be worked upon.

Administration of Adaptor Configuration Data: Input Request=Enumerate Branch/Adaptors/Adaptor #/(In)Active Configuration/Control Unit x##/Logical Units Administrator requests an enumeration of, for example, "/Adaptors/Adaptor 1/Inactive Configuration/Control Unit x00/Logical Units" 707.

Host DLL builds and returns a string consisting of a concatenation of the following: 702

A. For each emulated devices per Logical Unit Count for the specified Adaptor configuration data for this adaptor, indexed to the specified control unit (the following uses of ## is the current Logical Unit Count entry+the Logical Unit Base, providing the emulated devices address as it appears to the mainframe.):

1. "Device x## Name(s)" with a flag indicating this is a text box. This includes the currently assigned value per the specified Adaptor configuration data for this adaptor, indexed to the specified CU and emulated devices per the current Logical Unit Count entry.

2. "Device x## Group(s)" with a flag indicating this is a text box. This includes the currently assigned value per the specified Adaptor configuration data for this adaptor, indexed to the specified CU and emulated devices per the current Logical Unit Count entry.

3. If the specified Adaptor configuration is the active configuration:

a. "Device x## Status" with a flag indicating this is a text box. This includes either the currently assigned emulated devices Client value (client userid) if the emulated devices In-Use flag indicates "in use", otherwise "this device is not in use". The emulated devices values involved are per the specified Adaptor configuration data for this adaptor, indexed to the specified CU and emulated devices per the current Logical Unit Count entry. This field is marked as non-modifiable meaning that this data cannot be changed (informational only)

Administration of Adaptor Configuration Data: Input Request=Enumerate Branch/Adaptors/Adaptor #/Configuration Control Administrator requests an enumeration of, for example, "/Adaptors/Adaptor 1/Configuration Control" 708.

Host DLL builds and returns a string consisting of a concatenation of the following: 702

- A. "Check this then click save to activate the inactive config" with a flag indicating this is a check box and a value of unchecked.
- B. "Check this then click save to copy the inactive config to the inactive" with a flag indicating this is a check box and a value of unchecked.
- C. "Check then then click save to purge the inactive config" with a flag indicating this is a check box and a value of unchecked.
- D. "Check this then click save to POR the adaptor" with a flag indicating this is a check box and a value of unchecked.
- E. "Force adaptor offline" with a flag indicating this is a check box. This includes the currently assigned value per the specified Adaptor configuration data for this adaptor.

Continuing with non-illustrated, non-limiting examples of Administrative processing functionality:

Administration of Adaptor Configuration Data: Data Assignment of a /Adaptors/Adaptor #/(In)Active Configuration/Control Unit x##/Logical Units value:

Administrator

1. Requests an assignment of any modifiable value under "/Adaptors/Adaptor #/(In)Active Configuration/Control Unit x##/Logical Units" providing the new value along with the path to the data name.

Host DLL

2. Assigns the specified data of the adaptor, indexed to the specified CU and Logical Unit, to the provided value.
3. Saves the data to non-volatile storage through SA.
4. If the change was to an emulated devices Name then, if that emulated devices is currently in use by a user per the emulated devices In-Use flag, use the emulated devices Client value to locate the client object then issue that client a message indicating the new emulated devices name.
5. If the change was to an emulated devices Groups then, if that emulated devices is currently in use by a user per the emulated devices In-Use flag, use the emulated devices Client value to locate the client object and revalidate the client's authority exactly as is in accordance with Client Connection discussion. If the client no longer has the authority to access the device then send him a message to that effect and perform Client Disconnection processing.

Administration of Adaptor Configuration Data: Data Assignment of a /Adaptors/Adaptor #/(In)Active Configuration/Control Unit x##/Assignments value:

1. Administrator requests an assignment of any modifiable value under "/Adaptors/Adaptor #/(In)Active Configuration/Control Unit x##/Assignments", providing the new value along with the path to the data name.

Host DLL

2. Ensures that every Logical Unit Base and Logical Unit Count is within the ranges established (and published) as acceptable to the adaptors and IBM mainframe computers. If not then reject the change
3. Assigns the specified data of the adaptor, indexed to the specified CU, to the provided value.
4. Saves the data to non-volatile storage through SA.

Administration of Adaptor Configuration Data: Admin checked /Adaptors/Adaptor #/Configuration Control/Check this then click save to activate the inactive config 1. Administrator requests to activate the inactive configuration of the specified adaptor.

Host DLL

2. Uses the configuration datas for the specified adaptor.
3. Indicates that the adaptor is unavailable for use by clients.
4. For each client currently connected to an emulated devices on this adaptor:
   A. Issue a message to the client indicating that they are being disconnected due to administrator device management.
   B. Perform Client Disconnection.
5. Exchanges the contents of the active configuration with that of the inactive configuration.
6. Saves the configurations to non-volatile storage through SA.
7. Performs Adaptor Configuration Load.

Administration of Adaptor Configuration Data: Admin checked /Adaptors/Adaptor #/Configuration Control/Check this then click save to copy the inactive config to the inactive 1. Administrator requests to copy the active configuration to the inactive configuration of the specified adaptor.

Host DLL

2. Uses the configuration datas for the specified adaptor.
3. Copies the contents of the active configuration into the inactive configuration.
4. Saves the inactive configuration to non-volatile storage through SA.

Administration of Adaptor Configuration Data: Admin checked /Adaptors/Adaptor #/Configuration Control/Check then then click save to purge the inactive config 1. Administrator requests to purge the inactive configuration of the specified adaptor.

Host DLL

2. Uses the inactive configuration data for the specified adaptor.
3. Clear it out to default values as does Start Server when a configuration doesn't exist. In summary, all of the CUTypes are assigned to 7412 and everything else is assigned to 0.
4. Saves the inactive configuration to non-volatile storage through SA.

Administration of Adaptor Configuration Data: Admin checked /Adaptors/Adaptor #/Configuration Control/Check this then click save to POR the adaptor Administrator requests to perform a Power On Reset (POR, or an offline/online recycle) of the specified adaptor.

Host DLL performs Adaptor Configuration Load for the specified adaptor.

Administration of Adaptor Configuration Data: Admin checked /Adaptors/Adaptor #/Configuration Control/Force adaptor offline Administrator 1. Requests a change to the flag that controls whether or not the adaptor is to be forced offline to the mainframe to which it is connected.

Host DLL

2. Assigns the supplied setting to the data for the specified adaptor.
3. Saves the value to non-volatile stored through SA.
4. Performs Adaptor Configuration Load.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

It will be apparent to those skilled in the art that various modifications and variations can be made in the construction, configuration, and/or operation of the present invention without departing from the scope or spirit of the invention. For example, in the embodiments mentioned above, variations in the materials used to make each element of the invention may vary without departing from the scope of the invention. Thus, it is intended that the present invention cover the modifications and variations of the invention provided they come within the scope of the appended claims and their equivalents.

What is claimed is:

1. A system to facilitate remote configuration and utilization of an emulated device controller via communication of encrypted data external to said controller comprising:

at least one security administrator central processing unit communicably attached to an emulation server central processing unit;

at least one client central processing unit communicably attached to said emulation server central processing unit;

first software for validating authorized remote user access to at least one emulated device and encryption of data, said first software executing from within said emulation server central processing unit;

second software for facilitating remote configuration and utilization of an emulated device controller, for controlling mainframe devices said second software executing from within said emulation server central processing unit;

at least one hardware adaptor card communicably attached to said emulation server central processing unit; and at least one host processor central processing unit communicably attached to said emulation server central processing unit via said hardware adaptor card.

2. The system to facilitate remote configuration and utilization of an emulated device controller in accordance with claim 1 wherein said first software is receptive to and processes data communicated from said second software.

3. The system to facilitate remote configuration and utilization of an emulated device controller in accordance with claim 1 wherein said second software is receptive to and processes data communicated from said first software.

4. The system to facilitate remote configuration and utilization of an emulated device controller in accordance with claim 1 further comprising a communication means wherein data exchanged between said client central processing unit and said emulation server central processing unit is encrypted prior to transmission between said central processing units and decrypted subsequent to transmission between said central processing units.

5. The system to facilitate remote configuration and utilization of an emulated device controller in accordance with claim 1 further comprising a communication means wherein data exchanged between said security administrator central processing unit and said emulation server central processing unit is encrypted prior to transmission between said central processing units and decrypted subsequent to transmission between said central processing units.

6. The system to facilitate remote configuration and utilization of an emulated device controller in accordance with claim 1 wherein said second software means further comprises:

(a) a software component means for initializing said emulation server central processing unit;

(b) a software component means for terminating communication with said emulation server central processing unit;

(c) a software component means for loading said hardware adaptor with an emulated input/output device configuration;

(d) a software component means for recognizing and communicating with at least one client central processing unit;

(e) a software component means for disconnecting a previously recognized client; and (f) a software component means for executing administrative support protocol.

7. A computer based method for facilitating remote configuration and utilization of an emulated device controller for controlling mainframe devices via communication of encrypted data external to said controller comprising:

(a) initializing and communicating with an emulation server central processing unit;

(b) establishing a client connection with said emulation server;

(c) loading a hardware adaptor card in communication with said emulation server with an emulated input/output device configuration;

(d) disconnecting said previously connected client;

(e) terminating communication with said emulation server central processing unit; and (f) executing administrative support protocol from a security administrator central processing unit.

8. The computer based method of claim 7 wherein said initializing of an emulation server central processing unit further comprises:

(a) initializing module-wide variables utilized by a hardware device driver;

(b) enumerating hardware adaptors using said adaptor's vendor and device identifiers;

(c) initializing hardware adaptor-specific variables utilized by said driver;

(d) allocating and reserving said adaptor resources;

(e) resetting said adaptor;

(f) downloading microcode to said adaptor;

(g) initializing said adaptor;

(h) requesting said adaptor's connection to each unique interrupt request line;

(i) initiating an adaptor timer and timer support;

(j) exposing standard module-wide support to applications;

(k) initializing variables utilized by a host dynamically linked library;

(l) clearing a user connection block;

(m) exposing and making available to first software an adaptor specific administrative instruction set;

(n) creating a serialization mechanism to be used by configuration support routines;

(o) opening said driver;

(p) requesting from said driver the number of recognized adaptors;

(q) returning from said driver the number of adaptors in response to immediately preceding request;

(r) requesting from said driver its version number;

(s) returning driver version number in response to immediately preceding request;

(t) recording driver version and the number of adaptors controlled by said driver;

(u) indicating said adaptor's unavailability;

(v) loading said adaptor's offline status;

(w) loading said adaptor's activity status;

(x) loading a second inactive configuration data sequence; and (y) ensuring loaded adaptor configuration is within operational ranges.

9. The computer based method of claim 7 wherein terminating communication with said emulation server central processing unit further comprises:

(a) disconnecting each currently connected user;

(b) forcing recognized adaptors offline;

(c) closing a hardware device driver;

(d) freeing all allocated storage and resources;

(e) stopping all timers;

(f) eliminating module-wide exposure of support to applications;

(g) causing each adaptor to be offline and resetting each adaptor;

(h) disconnecting all previously connected interrupt request lines;

(i) destroying each adaptor object instance;

(j) destroying each adaptor's logical unit driver object instances;

(k) eliminating the exposure of logical unit support to applications; and (l) freeing all allocated storage and resources.

10. The computer based method of claim 7 wherein said loading of a hardware adaptor with an emulated input/output device configuration further comprises:

(a) indicating said adaptor's unavailability;

(b) disconnecting client currently utilizing said adaptor;

(c) determining if adaptor should be online or offline to host processor;

(d) requesting actual or empty driver configuration for said adaptor predicated upon adaptor's online or offline status configuration;

(e) causing the adaptor to be offline to an associated channel;

(f) obviating each of said adaptor's logical unit driver object instances;

(g) eliminating exposure of logical unit support to applications;

(h) freeing all adaptor allocated storage and resources;

(i) determining if logical units are to be emulated;

(j) requesting said adaptor be brought online to an associated channel; and (k) indicating said adaptor is availability for clients.

11. The computer based method of claim 7 wherein said establishing of a client connection further comprises:

(a) initializing client dependant variables;

(b) employing first software to effect a connection to a host dynamically linked library;

(c) retaining client name in said dynamically linked library;

(d) ascertaining authorized device types and security groups for said client;

(e) creating a new client object instance for said client;

(f) stating said client object in a user connection block;

(g) communicating to host dynamically linked library the command version level representing client's feature set;

(h) storing the client's command version level;

(i) sending to the host dynamically linked library emulated device type of interest;

(j) storing client's device type of interest;

(k) determining host dynamically linked library command version level;

(l) storing host dynamically linked libraries command version level;

(m) requesting currently available emulated devices of host dynamically linked library;

(n) returning response block in response to the client's request; and (o) requesting from the host dynamically linked library to be connected to a logical unit.

12. The computer based method of claim 7 wherein said disconnecting of a previously connected client further comprises:

(a) closing logical unit connection;

(b) terminating threads created to perform input/output with the logical unit;

(c) setting the logical unit in-Use flag to "not in use";

(d) setting the logical unit Client value to "none";

(e) freeing all allocated storage and resources for said client object.

13. The computer based method of claim 7 wherein said execution of said administrative support protocol further comprises:

determining an instruction set sequence to execute based upon a user input command string; and executing said determined instruction set sequence.

14. A computer readable medium encoded with a computer program for facilitating the remote configuration and utilization of an emulated device controller for controlling mainframe devices via communication of encrypted data comprising:

(a) an instruction set for initializing an emulation server central processing unit;

(b) an instruction set for terminating communication with said emulation server central processing unit;

(c) an instruction set for loading a hardware adaptor with an emulated input/output device configuration for controlling mainframe devices;

(d) an instruction set for establishing a client connection;

(e) an instruction set for disconnecting a previously connected client; and (f) an instruction set for executing an administrative support protocol.

15. The computer program of claim 14 wherein said instruction set for initializing an emulation server central processing unit further comprises:

(a) initializing module-wide variables utilized by a hardware device driver;

(b) enumerating hardware adaptors using said adaptor's vendor and device identifiers;

(c) initializing hardware adaptor-specific variables utilized by said driver;

(d) allocating and reserving said adaptor resources;
(e) resetting said adaptor;
(f) downloading microcode to said adaptor;
(g) initializing said adaptor;
(h) requesting said adaptor's connection to each unique interrupt request line;
(i) initiating an adaptor timer and timer support;
(j) exposing standard module-wide support to applications;
(k) initializing variables utilized by a host dynamically linked library;
(l) clearing a user connection block;
(m) exposing and making available to first software an adaptor specific administrative instruction set;
(n) creating a serialization mechanism to be used by configuration support routines;
(o) opening said driver;
(p) requesting from said driver the number of recognized adaptors;
(q) returning from said driver the number of adaptors in response to immediately preceding request;
(r) requesting from said driver its version number;
(s) returning driver version number in response to immediately preceding request;
(t) recording driver version and the number of adaptors controlled by said driver;
(u) indicating said adaptor's unavailability;
(v) loading said adaptor's offline status;
(w) loading said adaptor's activity status;
(x) loading a second inactive configuration data sequence; and
(y) ensuring loaded adaptor configuration is within operational ranges.

16. The computer program of claim 14 wherein said instruction set for terminating communication with said emulation server central processing unit further comprises:
(a) disconnecting each currently connected user;
(b) forcing recognized adaptors offline;
(c) closing a hardware device driver;
(d) freeing all allocated storage and resources;
(e) stopping all timers;
(f) eliminating module-wide exposure of support to applications;
(g) causing each adaptor to be offline and resetting each adaptor;
(h) disconnecting all previously connected interrupt request lines;
(i) destroying each adaptor object instance;
(j) destroying each adaptor's logical unit driver object instances;
(k) eliminating the exposure of logical unit support to applications; and
(l) freeing all allocated storage and resources.

17. The computer program of claim 14 wherein said instruction set for loading a hardware adaptor with an emulated input/output device configuration further comprises:
(a) indicating said adaptor's unavailability;
(b) disconnecting client currently utilizing said adaptor;
(c) determining if adaptor should be online or offline to host processor;
(d) requesting actual or empty driver configuration for said adaptor predicated upon adaptor's online or offline status configuration;
(e) causing the adaptor to be offline to an associated channel;
(f) obviating each of said adaptor's logical unit driver object instances;
(g) eliminating exposure of logical unit support to applications;
(h) freeing all adaptor allocated storage and resources;
(i) determining if logical units are to be emulated;
(j) requesting said adaptor be brought online to an associated channel; and
(k) indicating said adaptor is availability for clients.

18. The computer program of claim 14 wherein said instruction set for establishing a client connection further comprises:
(a) initializing client dependant variables;
(b) employing first software to effect a connection to a host dynamically linked library;
(c) retaining client name in said dynamically linked library;
(d) ascertaining authorized device types and security groups for said client;
(e) creating a new client object instance for said client;
(f) storing said client object in a user connection block;
(g) communicating to host dynamically linked library the command version level representing client's feature set;
(h) storing the clients command version level;
(i) sending to the host dynamically linked library emulated device type of interest;
(j) storing client's device type of interest;
(k) determining host dynamically linked library command version level;
(l) storing host dynamically linked library's command version level;
(m) requesting currently available emulated devices of host dynamically linked library;
(n) returning response block in response to the client's request; and
(o) requesting from the host dynamically linked library to be connected to a logical unit.

19. The computer program of claim 14 wherein said instruction set for disconnecting a previously connected client further comprises:
(a) closing logical unit connection;
(b) terminating threads created to perform input/output with the logical unit;
(c) setting the logical unit In-Use flag to "not in use";
(d) setting the logical unit Client value to "none";
(e) freeing all allocated storage and resources for said client object.

20. The computer program of claim 14 wherein said instruction set for executing an administrative support protocol further comprises:
determining an instruction set sequence to execute based upon a user input command string; and
executing said determined instruction set sequence.

* * * * *